May 15, 1928.  J. M. RUSNAK  1,669,915
COUNTERBALANCING MEANS FOR MULTIPLE DRILLS
Original Filed Dec. 2, 1922   3 Sheets-Sheet 3

INVENTOR
J. M. Rusnak
BY
Joseph N. Schofield
ATTORNEY

Patented May 15, 1928.

1,669,915

UNITED STATES PATENT OFFICE.

JOHN M. RUSNAK, OF HARTFORD, CONNECTICUT, ASSIGNOR TO PRATT & WHITNEY COMPANY, OF NEW YORK, N. Y., A CORPORATION OF NEW JERSEY.

COUNTERBALANCING MEANS FOR MULTIPLE DRILLS.

Original application filed December 2, 1922, Serial No. 604,482. Divided and this application filed February 4, 1926. Serial No. 85,935.

This invention relates primarily to drilling machines and more especially to a multiple spindle drilling machine. Such a machine ordinarily comprises a supporting column on which a drill spindle supporting head is slidably mounted. Means is provided for rotating the drill spindle or spindles in the head and other means is provided for moving the head slowly downward on the column for feeding or moving it rapidly in either direction for traversing.

One object of the invention is to provide an improved drilling machine of the type stated adapted to function either as a semi-automatic machine wherein all the feeding and traversing movements of the head are power operated and controlled automatically or as a plain drilling machine wherein only the feeding movement is performed by power, the head being adapted to be readily traversed in both directions by hand.

Another object of the invention is to provide an improved counterbalancing mechanism for the drill spindle supporting head, such mechanism providing for an accurate counterbalancing of the head and safety holding means in connection therewith for preventing the dropping of the head should the counterbalancing mechanism fail.

With the above and other objects in view, my invention consists in the features of construction and operation set forth in the following specification and illustrated in the accompanying drawings. In such drawings annexed hereto and forming a part of this specification, I have shown my invention as embodied in a multiple spindle drilling machine but it will be understood that the invention can be otherwise embodied and that the drawings are not to be construed as defining or limiting the scope of the invention, the claims appended to this specification being relied upon for that purpose.

Referring to the figures of the drawings.

Figure 1:
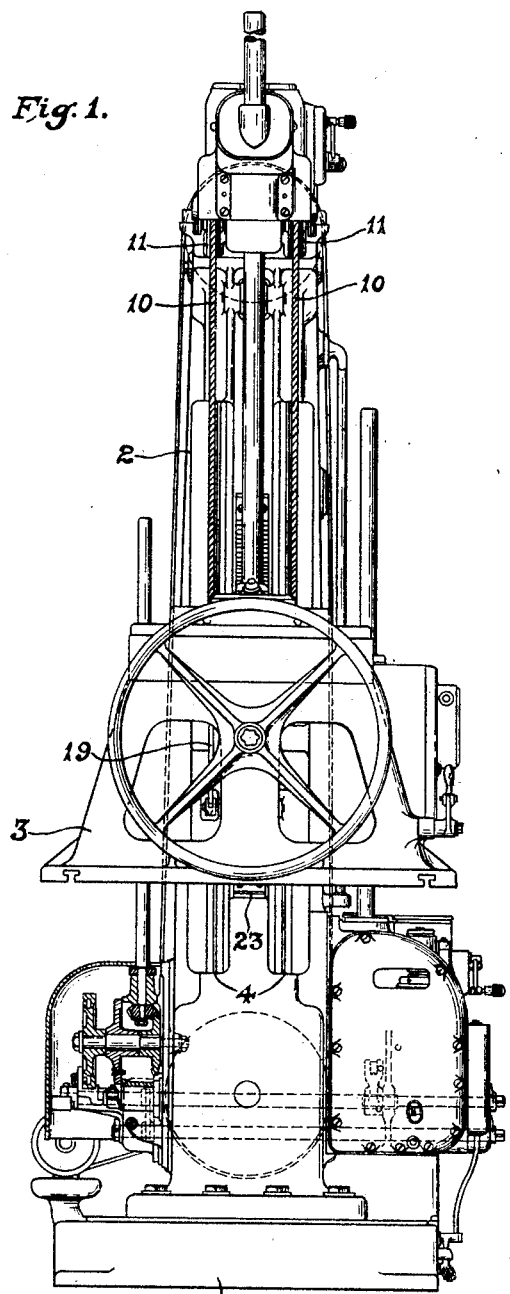
Figure 1 is a front elevation of a complete multiple spindle drilling machine comprising my invention.

In the above mentioned drawings, I have shown but one embodiment of the invention which is now deemed preferable, but it is to be understood that changes and modifications may be made within the scope of the appended claims without departing from the spirit of the invention.

My invention comprises a drilling machine construction so designed that the same, in its simpler form, is a hand or plain drilling machine and in its more complex form becomes a semi-automatic drilling machine. In shop terms and in the usual mechanical parlance, such a semi-automatic drilling machine as herein shown and described is known as an automatic multiple spindle drilling machine. However, since such machine is not in fact fully automatic, the same is herein termed "semi-automatic". The original cost of a plain drilling machine is considerably less than an automatic or semi-automatic machine and such plain machine is more adapted to certain classes of work. By adding certain other mechanism to the plain drilling machine illustrated herein, the same may be converted into a semi-automatic drilling machine, which machine is also adapted to be used as a plain drilling machine when desired. By such a standardized construction, the manufacture of these two types of drilling machines is greatly simplified and the adaptability of the semi-automatic machine to use as a hand machine is of considerable advantage.

Either of the forms of the invention requires the use of a counterbalancing means for the vertically movable head supporting the drill spindles so that this head may be raised or lowered manually without undue exertion, or may be raised or lowered by power without a large expenditure of power.

This application forms a division of my Patent No. 1,594,429 granted August 3, 1926, in which the complete machine is disclosed in detail.

Referring more specifically to the drawings by reference characters, 1 indicates the base and 2 the column of my improved drilling machine. Mounted for vertical sliding movement on the column is a drill head 3. The head 3 is preferably slidably mounted on the column upon ways 5 on the column. A pair of straps 7 secured to the head by bolts 8 engage rear surfaces of the ways 5 and hold the projections firmly seated against the column. In this manner the head is firmly supported and accurately guided in its movements on the column.

Figure 2:
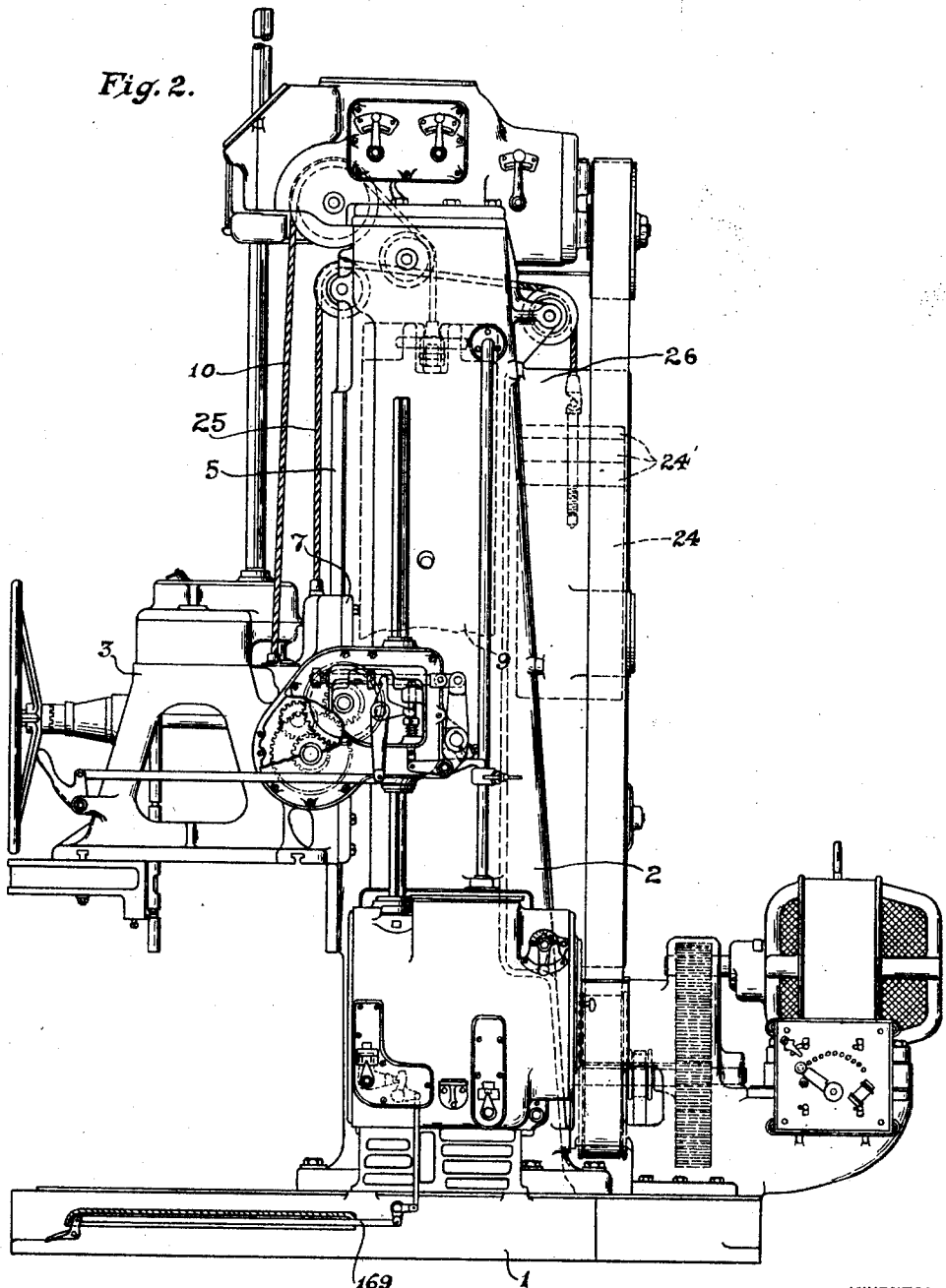
Fig. 2 is a side elevation thereof.
Figure 3:
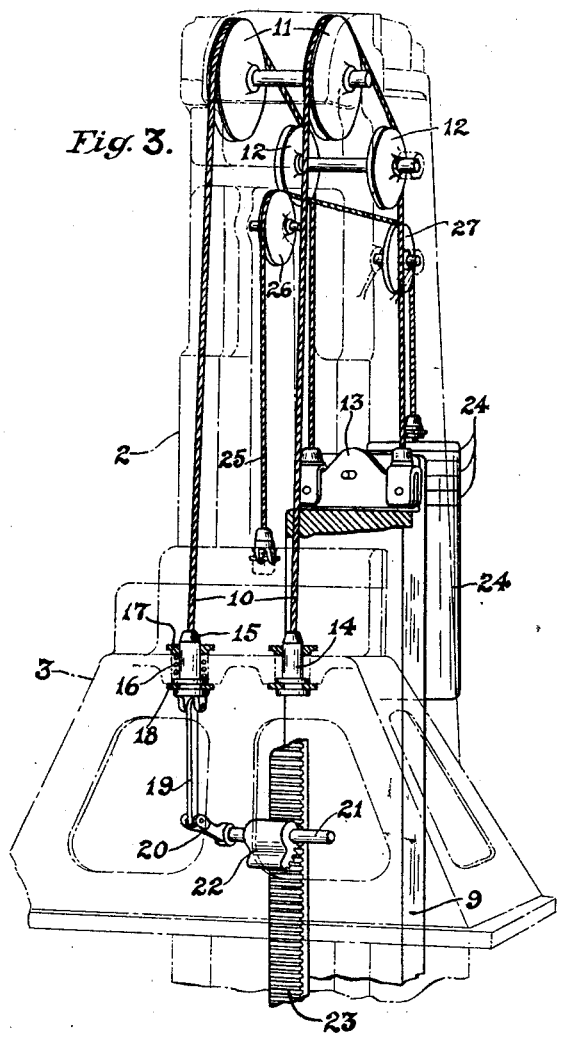
Fig. 3 is a perspective view showing my improved drill head counterbalancing mechanism.

In a large machine of the type illustrated, the weight of the head 3 is considerable. It is therefore necessary to counterbalance this weight and this function is preferably accomplished by the novel counterbalancing arrangement shown in Figs. 2 and 3. A main weight 9 movable vertically in the center of the column is connected to the head 3 by a pair of cables 10 passing over sheaves 11 and 12. The cables, at one end, are respectively secured to the ends of an equalizer bar 13 pivoted at its center to the weight 9 whereby each cable supports an equal portion of the weight. One cable is secured rigidly to the head at 14. The other cable is connected to an element 15 slidably mounted in the head. A spring 16 between the lower end of the element 15 and a bushing 17 secured to the head normally forces the element downwardly. The tension on the cable holds the spring compressed. A washer 18 on the element limits the upward movement of the element by contacting with the head 3. A link 19 operatively connects the element 15 with an arm 20 on a shaft 21 in the head and provided thereon is a toothed member 22 adjacent a vertically extending rack 23 on the column. Should the cable break or the tension thereon be released for any cause, the expansion of the spring 16 will move the member 22 about its pivot and engage the teeth thereon with the rack 23 thereby supporting the head against downward movement.

The rear wall of the column is curved transversely to receive therein a second weight 24 movable vertically within a guard 26 secured to the column 2. A centrally located cable 25 passing over sheaves 27 connects the head 3 to the weight 24. The weight 24 is provided with a plurality of varied sized removable sections 24' whereby to compensate for the weight of any parts added or removed from the head. An opening 26', normally closed by a removable cover plate, is formed in the guard 26 whereby the operator may have ready access to the weights 24'. In this manner the head 3 may be accurately counterbalanced for each particular drill spindle arrangement used by the machine for different drilling operations. Also the safety device in connection with one of the cables 10 positively prevents a dropping of the drill head 3 should the counterbalancing mechanism for any reason fail to support the same.

What I claim is:

1. In a machine of the class described, the combination of a column, a head slidable vertically on the column, a pair of counterweights, one counterweight being movable vertically in the column and the other being exposed, an equalizing plate pivoted to the counterweight in the column, a pair of cables having their ends respectively connected to a fixed part of the head and to the ends of the equalizing plate, the exposed counterweight being formed in removable sections whereby the head may be accurately counterbalanced, and a third cable between the said pair of cables operatively connecting the exposed counterweight with the head.

2. In a drilling machine, the combination of a base, a column thereon, a drill head slidable on the column, a plurality of spindles mounted in the head, a driving shaft supported on the base, an operative connection including a vertically extending belt from the shaft to the spindles, a pair of counterweights, one counterweight being movable vertically in the column and the other being positioned adjacent thereto and movable vertically between the opposed portions of the said belt, and cables operatively connecting the counterweights to a fixed part of the head for counterbalancing the same, the said other counterweight being formed in removable sections whereby the head may be accurately counterbalanced.

In testimony whereof, I hereto affix my signature.

JOHN M. RUSNAK.